(12) United States Patent
Suzuki et al.

(10) Patent No.: US 12,461,311 B2
(45) Date of Patent: Nov. 4, 2025

(54) FUSION SPLICING SYSTEM, FUSION SPLICING DEVICE, AND DETERIORATION DETERMINATION METHOD

(71) Applicant: Sumitomo Electric Optifrontier Co., Ltd., Yokohama (JP)

(72) Inventors: Takahiro Suzuki, Yokohama (JP); Kazuyoshi Ooki, Yokohama (JP); Takaharu Ohnishi, Yokohama (JP); Hideaki Yusa, Yokohama (JP)

(73) Assignee: Sumitomo Electric Optifrontier Co., Ltd., Kanagawa (JP)

( * ) Notice: Subject to any disclaimer, the term of this patent is extended or adjusted under 35 U.S.C. 154(b) by 590 days.

(21) Appl. No.: 17/996,822

(22) PCT Filed: Apr. 28, 2021

(86) PCT No.: PCT/JP2021/017016
§ 371 (c)(1),
(2) Date: Oct. 21, 2022

(87) PCT Pub. No.: WO2021/221115
PCT Pub. Date: Nov. 4, 2021

(65) Prior Publication Data
US 2023/0204859 A1    Jun. 29, 2023

(30) Foreign Application Priority Data
Apr. 30, 2020    (JP) ................... 2020-080375

(51) Int. Cl.
*G02B 6/255* (2006.01)
(52) U.S. Cl.
CPC ................... *G02B 6/2553* (2013.01)

(58) Field of Classification Search
CPC ............................ G02B 6/2553; G02B 6/2551
See application file for complete search history.

(56) References Cited

U.S. PATENT DOCUMENTS

| 2003/0002827 A1 | 1/2003 | Ozawa et al. |
| 2015/0040615 A1 | 2/2015 | Wiley et al. |

FOREIGN PATENT DOCUMENTS

| JP | H102-044037 A | 2/1990 |
| JP | H04-199107 A | 7/1992 |
| JP | H09-005559 A | 1/1997 |
| JP | H09-197174 A | 7/1997 |
| JP | 2003-287643 A | 10/2003 |
| JP | 2004-317599 A | 11/2004 |

OTHER PUBLICATIONS

International Preliminary Report on Patentability issued in Patent Application No. PCT/JP2021/017016 dated Nov. 10, 2022.
"Letter of the Applicant", PCT/JP2021/017016, European Patent Office, dated Nov. 4, 2022.
International Search Report issued in Patent Application No. PCT/JP2021/017016 dated Jul. 27, 2021.

*Primary Examiner* — Robert G Bachner
(74) *Attorney, Agent, or Firm* — MCDONALD HOPKINS LLC (57) ABSTRACT

A fusion splicing system according to one embodiment includes: first and second electrodes that fusion-splice optical fibers by discharge; a fusion splicing device that has a discharge circuit that outputs a control signal to the first electrode and receives a feedback signal of the control signal from the second electrode; and a deterioration determination unit that determines from a state of the feedback signal whether or not the first electrode and the second electrode are deteriorated.

18 Claims, 9 Drawing Sheets

FUSION SPLICING SYSTEM, FUSION SPLICING DEVICE, AND DETERIORATION DETERMINATION METHOD

TECHNICAL FIELD

The present disclosure relates to a fusion splicing system, a fusion splicing device, and a deterioration determination method.

This application is based upon and claims the benefit of priority from Japanese Patent Application No. 2020-080375, filed on Apr. 30, 2020, the entire contents of which are incorporated herein by reference.

BACKGROUND ART

Patent Literature 1 describes a fusion splicing device and a maintenance management method for a fusion splicer. The fusion splicing device includes a fusion splicer for fusion-splicing optical fibers to each other and a data management terminal connected to the fusion splicer via an I/O cable. The fusion splicer includes a discharge unit for fusion of optical fibers. The discharge unit has a pair of electrodes arranged to face each other on a stage on which two optical fibers that are fusion targets are mounted, and discharge occurs by applying a voltage between a pair of electrodes, so that the two optical fibers are fused.

CITATION LIST

Patent Literature

Patent Literature 1: Japanese Unexamined Patent Publication No. 2003-287643

SUMMARY OF INVENTION

According to one embodiment, there is provided a fusion splicing system including: a fusion splicing device that has first and second electrodes that fusion-splice optical fibers by discharge; a discharge circuit that outputs a control signal to the first electrode and receives a feedback signal of the control signal from the second electrode; and a deterioration determination unit that determines from a state of the feedback signal whether or not the first electrode and the second electrode are deteriorated.

According to one embodiment, there is provided a fusion splicing device including: first and second electrodes that fusion-splice optical fibers by discharge; a discharge circuit that outputs a control signal to the first electrode and receives a feedback signal of the control signal from the second electrode; and a signal monitor that monitors the feedback signal and determines from a state of the feedback signal whether or not the first electrode and the second electrode are deteriorated.

According to one embodiment, there is provided a deterioration determination method being a deterioration determination method that determines whether or not there is deterioration in a first electrode and a second electrode that fusion-splice optical fibers by discharge, including: outputting a control signal to the first electrode; receiving a feedback signal of the control signal from the second electrode; and determining from a state of the feedback signal whether or not the first electrode and the second electrode are deteriorated.

DESCRIPTION OF EMBODIMENTS

In some cases, a pair of electrodes of a fusion splicing device may deteriorate when used for a long period of time. For example, if fusion discharge repeatedly performed, discharge becomes unstable due to dirt or the like on the electrodes. As a method of determining deterioration of the electrode of the fusion splicing device, the number of times of using the electrode can be considered. However, in some cases, when the deterioration determination for the electrode is performed according to the number of times of using the electrode, the deterioration determination for the electrode may not be performed with high accuracy. Therefore, there is room for improvement in terms of the accuracy of determining the deteriorated state of the electrode.

The present disclosure is to provide a fusion splicing system, a fusion splicing device, and a deterioration determination method capable of determining a deteriorated state of an electrode with high accuracy.

According to the present disclosure, the deteriorated state of the electrode can be determined with high accuracy.

[Description of Embodiment] First, embodiments of the present disclosure will be listed and described. A fusion splicing system according to one embodiment includes a fusion splicing device having a first electrode and a second electrode for performing fusion splicing of an optical fiber by discharge and a discharge circuit for outputting a control signal to the first electrode and receiving a feedback signal of the control signal from the second electrode and a deterioration determination unit which determines whether or not the first electrode and the second electrode are deteriorated from a state of the feedback signal.

A fusion splicing device according to one embodiment includes: first and second electrodes that fusion-splice optical fibers by discharge; a discharge circuit that outputs a control signal to the first electrode and receives a feedback signal of the control signal from the second electrode; and a signal monitor that monitors the feedback signal and determines from a state of the feedback signal whether or not the first electrode and the second electrode are deteriorated.

The deterioration determination method according to one embodiment is a deterioration determination method for determining whether or not there is deterioration in the first electrode and the second electrode that fusion-splice the optical fibers by discharge, includes: outputting a control signal to the first electrode; receiving a feedback signal of the control signal from the second electrode; and determining from the state of the feedback signal whether or not the first electrode and the second electrode are deteriorated.

In the fusion splicing system, fusion splicing device, and deterioration determination method described above, the control signal is output to the first electrode, and the feedback signal of the control signal is output from the second electrode. Then, it is determined from the state of the feedback signal whether or not the first electrode and the second electrode are deteriorated. Therefore, the feedback signal of the control signal can be effectively used for determining the deterioration of the first electrode and the second electrode. When at least one of the first electrode and the second electrode is deteriorated, the feedback signal obtained along with the outputting of the control signal does not follow the control signal. The term "following the control signal" denotes that, for example, a value indicated by the feedback signal becomes a value corresponding to a value indicated by the control signal. For example, when the first electrode and the second electrode are not deteriorated, a value of the feedback signal becomes a value obtained by reversing positivity and negativity of the value of the control signal, and thus, the feedback signal follows the control signal. That is, the value of the feedback signal becomes the value corresponding to the value of the control signal (as an example, the value of the feedback signal becomes the value obtained by inverting the positivity and negativity of the value of the control signal). At this time, for example, a waveform of the feedback signal is displayed as the inverted waveform of the waveform of the control signal. "Not following" denotes that the value of the feedback signal does not correspond to the value of the control signal. At this time, for example, the waveform of the feedback signal is displayed as the waveform other than the inverted waveform of the control signal. In the fusion splicing system, fusion splicing device, and deterioration determination method described above, since the deterioration determination for the electrode is performed by using the characteristics of this feedback signal, the deterioration determination for the electrode can be performed easily and with high accuracy.

The deterioration determination unit may determine whether or not the first electrode and the second electrode are deteriorated from both the state of the control signal and the state of the feedback signal. In this case, since the state of the feedback signal can be determined in comparison with the state of the control signal, the state of the feedback signal can be determined easily and with higher accuracy. The term "signal state" denotes a transition of the value indicated by the signal. As described above, when the deterioration determination for the first electrode and the second electrode is performed from both the state of the control signal and the state of the feedback signal, the deterioration determination for the electrodes can be performed with higher accuracy.

The fusion splicing system, fusion splicing device, and deterioration determination method described above may include a signal determination unit for determining whether or not each of the plurality of feedback signals is abnormal. The deterioration determination unit may determine whether or not the first electrode and the second electrode are deteriorated based on the number of feedback signals determined to be abnormal by the signal determination unit. In this case, since the deterioration determination for the electrode is performed based on the number of feedback signals determined to be abnormal by the signal determination unit, the deterioration determination for the electrode can be easily performed. Further, by performing the deterioration determination for the electrode by using the result of the signal determination unit determining whether or not there is abnormality in the plurality of feedback signals, the deterioration determination for the electrode can be performed with higher accuracy.

The deterioration determination unit may determine whether or not the first electrode and the second electrode are deteriorated from the state of the voltage value of the feedback signal. In this case, determination for the state of the feedback signal can be performed by using a voltage signal that is easy to handle in performing signal processing. Therefore, the determination for the feedback signal and the deterioration determination for the electrode can be performed more easily.

[Details of Embodiment] Specific examples of a fusion splicing system, a fusion splicing device, and a deterioration determination method according to the embodiment of the present disclosure will be described. In the description of the drawings, the same or corresponding elements are denoted by the same reference numerals, and duplicate description thereof will be omitted as appropriate. In addition, in some cases, the drawings may be partially simplified or exaggerated for the sake of easy understanding, and the dimensional ratios and the like are not limited to those described in the drawings.

Figure 1:
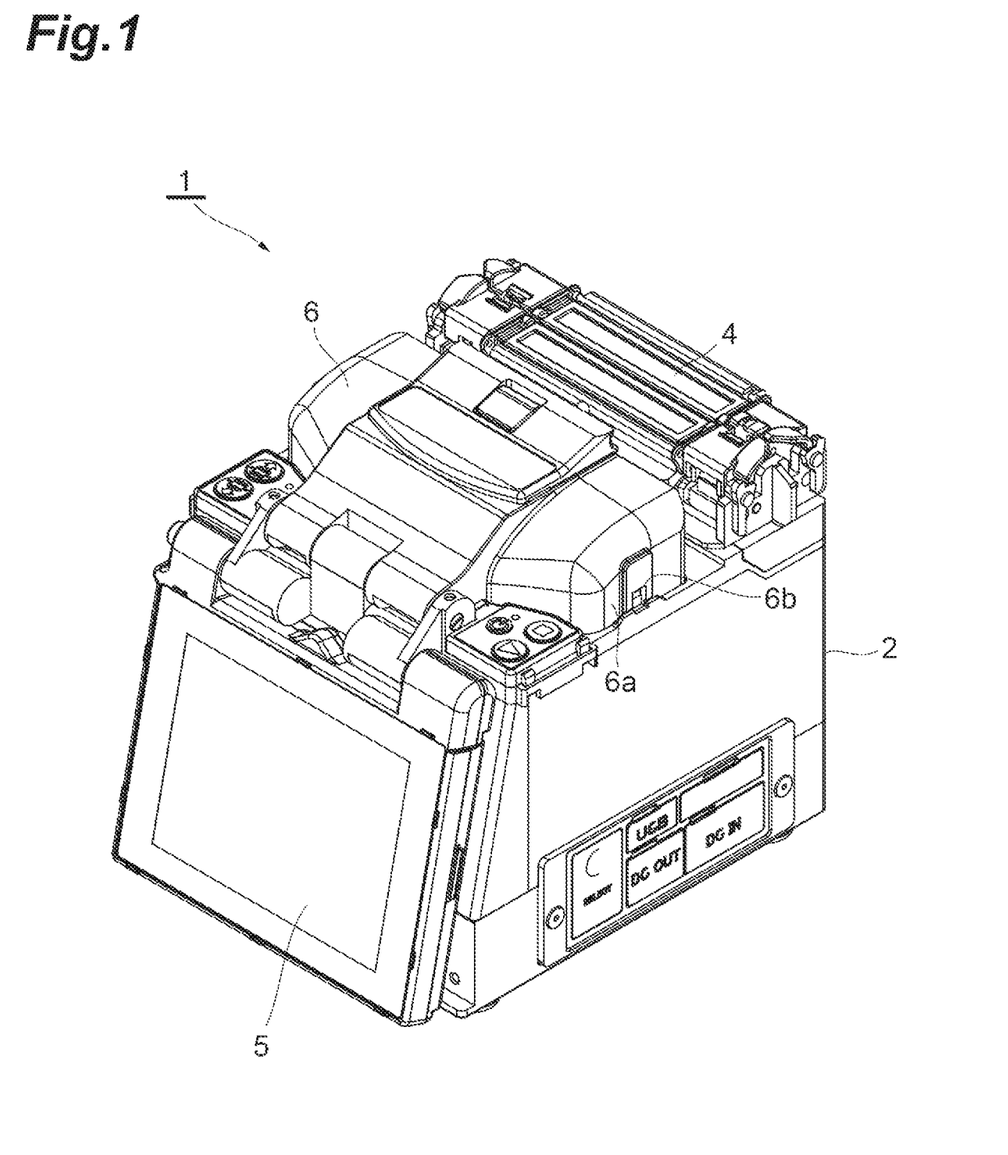
FIG. 1 is a perspective view illustrating a fusion splicing device according to an embodiment.
Figure 2:
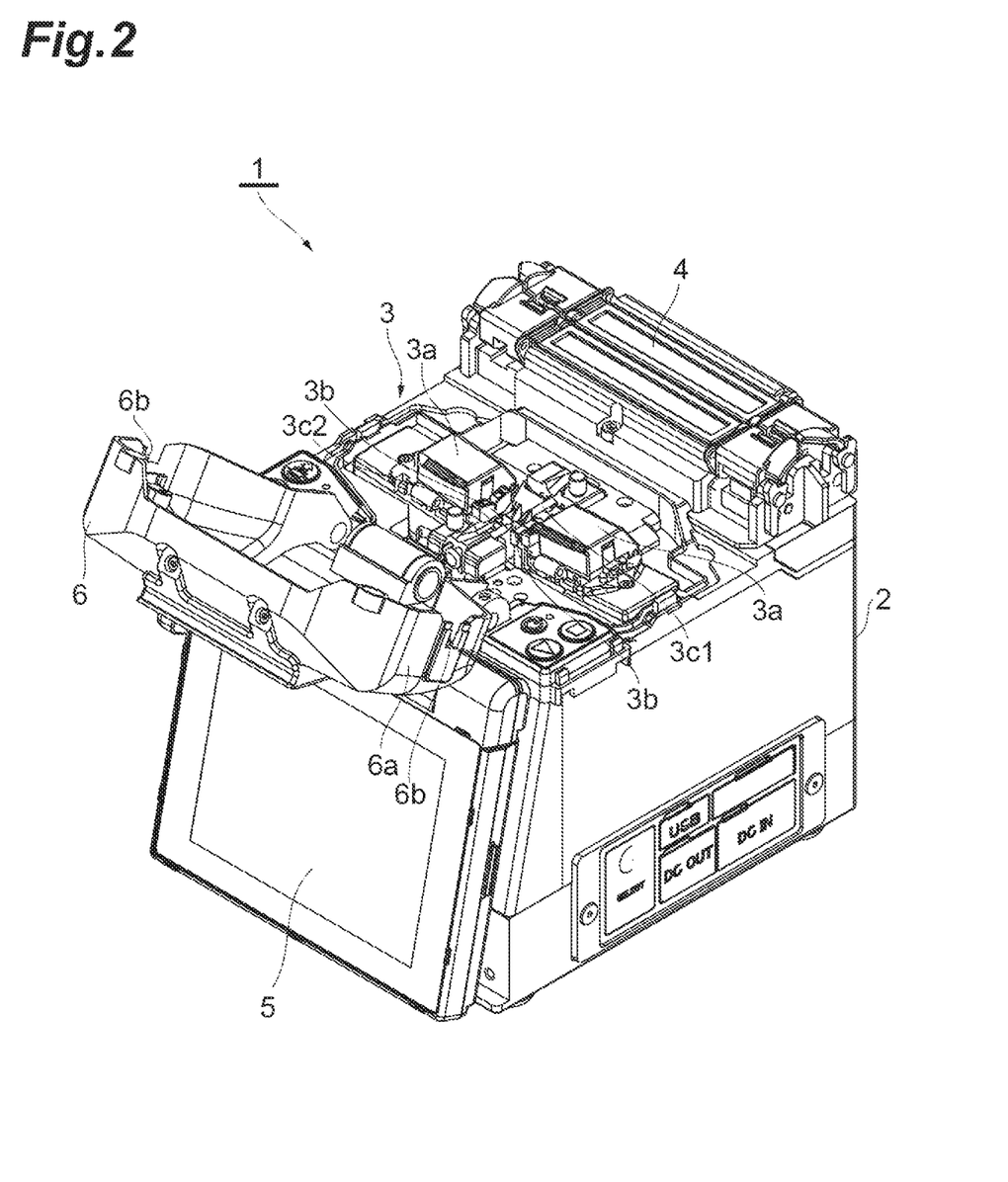
FIG. 2 is a perspective view illustrating a state where a windshield cover of the fusion splicing device of FIG. 1 is opened.

FIG. 1 is a perspective view illustrating the fusion splicing device 1 according to the embodiment of the present disclosure. FIG. 2 is a perspective view illustrating a state where a windshield cover 6 of the fusion splicing device 1 is opened. The fusion splicing device 1 is a device for fusion-splicing the optical fibers to each other and includes a box-shaped housing 2. A fusion unit 3 that fuses the optical fibers to each other and a heater 4 that heats and shrinks a fiber reinforcing sleeve that covers the a fusion splicing unit of the optical fiber fused by the fusion unit 3 are provided on the upper portion of the housing 2. The fusion splicing device 1 includes a monitor 5 that displays the state of fusion splicing between the optical fibers imaged by a camera arranged inside the housing 2. Further, the fusion splicing device 1 includes the windshield cover 6 that prevents wind from entering the fusion unit 3.

The fusion unit 3 includes a holder mounting portion on which a pair of optical fiber holders 3a can be mounted, a pair of fiber positioning units 3b, and a first electrode 3c1 and a second electrode 3c2 for performing discharge. Each of the first electrode 3c1 and the second electrode 3c2 is also referred to as the electrode rod. Each of the optical fibers that are fusion targets is held in the optical fiber holder 3a, and each optical fiber holder 3a is mounted and fixed in the holder mounting portion. The fiber positioning unit 3b is arranged between the optical fiber holders 3a and positions a distal end of the optical fiber fixed to each optical fiber holder 3a. The first electrode 3c1 and the second electrode 3c2 are arranged between the fiber positioning units 3b. Each of the first electrode 3c1 and the second electrode 3c2 is the electrode for fusing the tips of optical fibers with each other by arc discharge.

The windshield cover 6 is connected to the housing 2 so as to cover the fusion unit 3 in an openable/closable manner. The windshield cover 6 has a pair of side surfaces 6a. An introduction port 6b for introducing the optical fiber into the fusion unit 3 is formed on each side surface 6a of the windshield cover 6. The optical fiber introduced from the introduction port 6b reaches the optical fiber holder 3a of the fusion unit 3 and is held by the optical fiber holder 3a.

Figure 3:
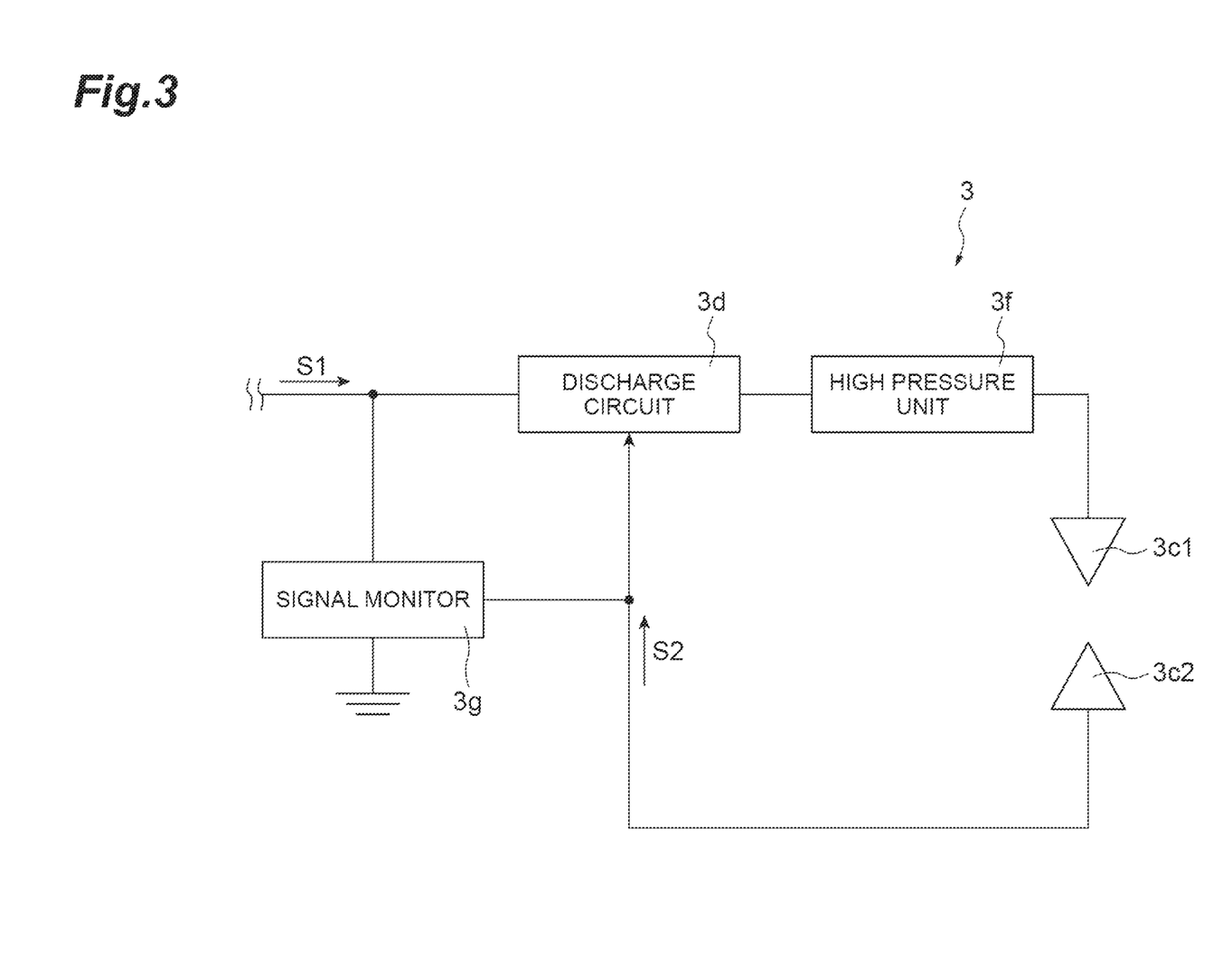
FIG. 3 is a diagram illustrating a pair of electrode rods, a discharge circuit, and a signal monitor of the fusion splicing device of FIG. 1.

FIG. 3 is a diagram schematically illustrating a signal circuit for the first electrode 3c1 and the second electrode 3c2. As illustrated in FIG. 3, the fusion unit 3 further has a discharge circuit 3d that performs discharge to the first electrode 3c1 and the second electrode 3c2, a high pressure unit 3f, and a signal monitor 3g for monitoring the signal for the first electrode 3c1 and the second electrode 3c2. When the discharge circuit 3d receives a control signal S1 indicating that the optical fiber is fused, the discharge circuit 3d applies a high voltage to the first electrode 3c1 via the high pressure unit 3f. By applying a high voltage to the first electrode 3c1, arc discharge occurs between the first electrode 3c1 and the second electrode 3c2. Along with the application of a high voltage to the first electrode 3c1 and the arc discharge, a feedback signal S2 (ignition signal) toward the discharge circuit 3d is generated from the second electrode 3c2. The signal monitor 3g monitors the feedback signal S2 and the control signal S1 to the discharge circuit 3d.

Figure 4:
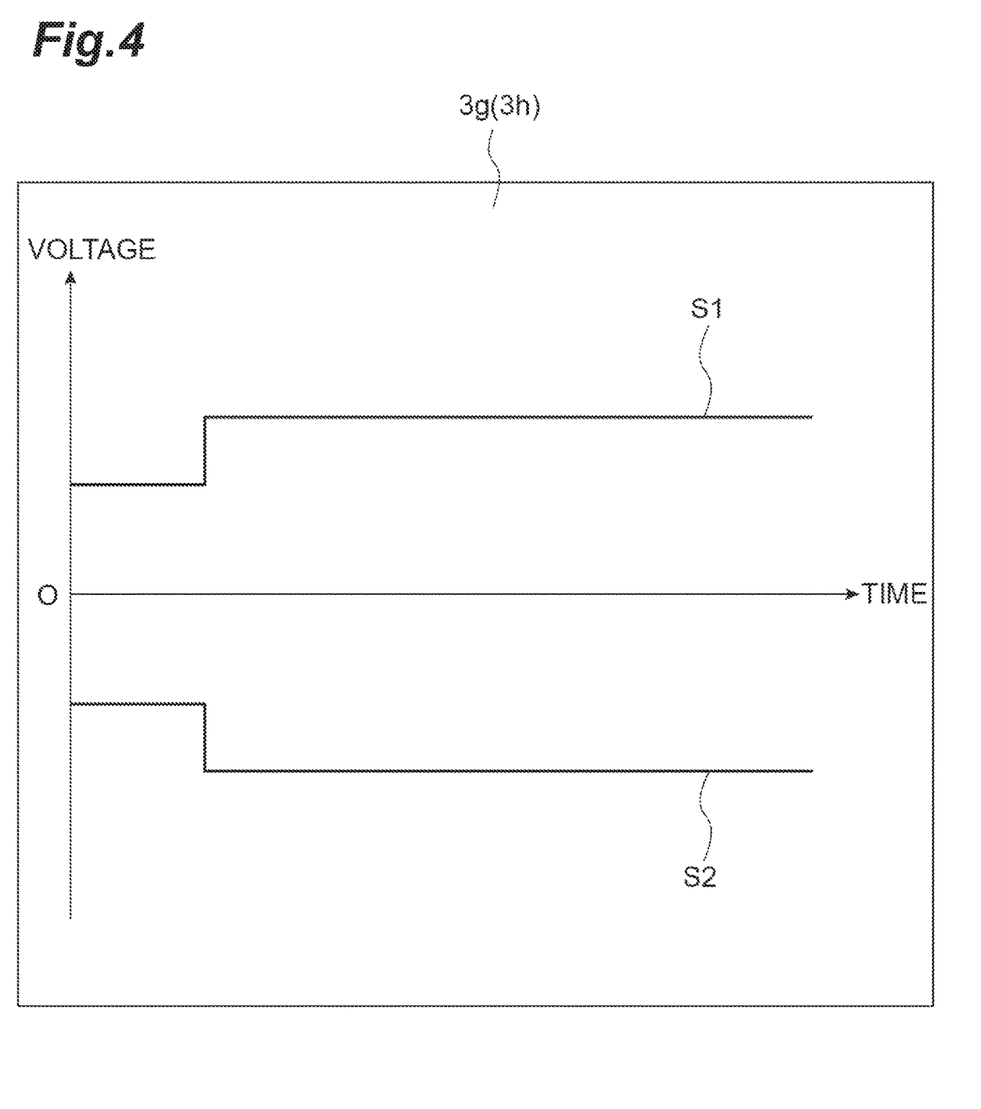
FIG. 4 is a diagram schematically illustrating a control signal and a normal feedback signal monitored by a signal monitor.

FIG. 4 is a diagram schematically illustrating the control signal S1 and the feedback signal S2 monitored by the signal monitor 3g. As illustrated in FIG. 4, the signal monitor 3g includes, for example, an oscilloscope 3h which is a signal display device, and the control signal S1 and the feedback signal S2 are displayed on the oscilloscope 3h. When the states of the first electrode 3c1 and the second electrode 3c2 are normal, the feedback signal S2 quickly follows the outputting of the control signal S1, and a stable waveform of the feedback signal S2 can be obtained in the signal monitor 3g. At this time, the value indicated by the feedback signal S2 is a value corresponding to the value indicated by the control signal S1 (as an example, the value indicated by the feedback signal S2 is a value obtained by reversing the positivity and negativity of the value indicated by the control signal S1).

Figure 5:
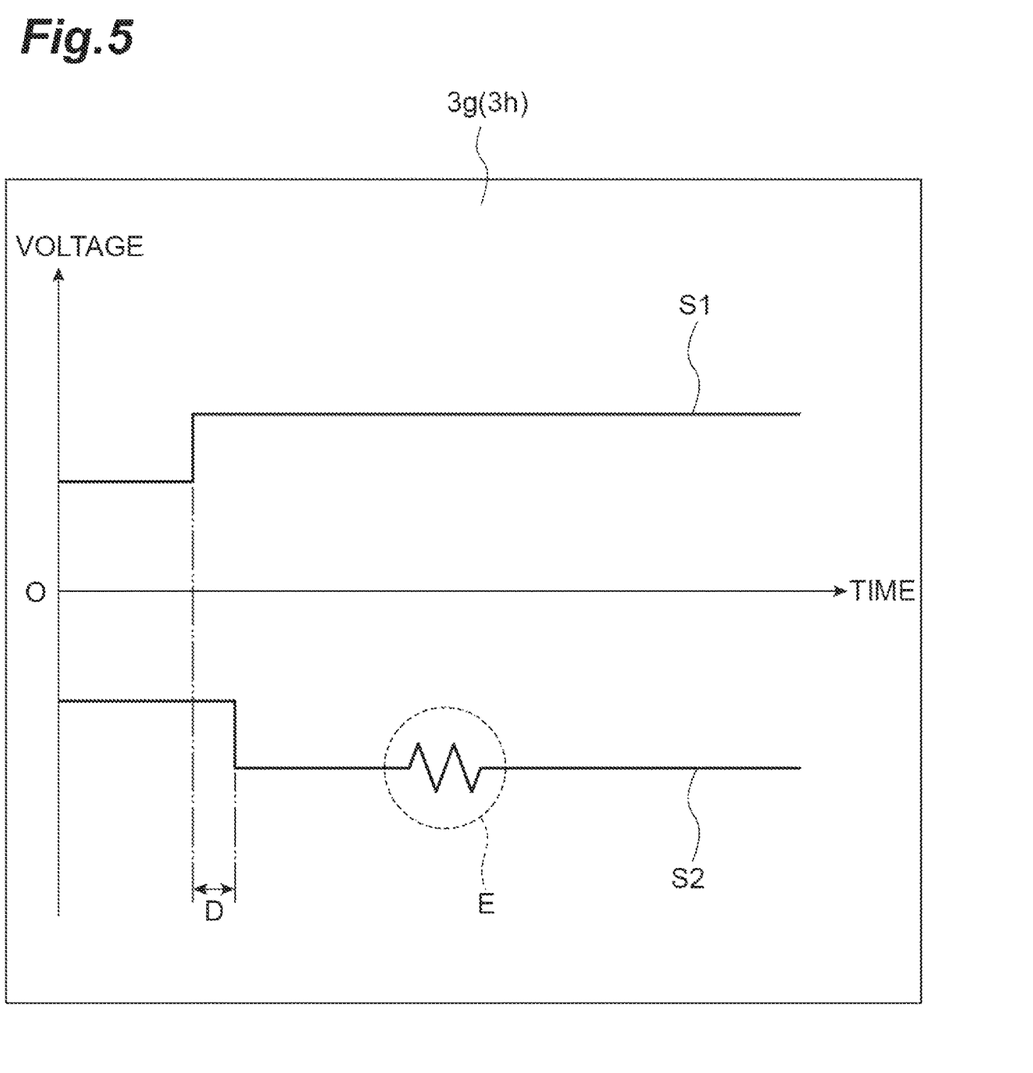
FIG. 5 is a diagram schematically illustrating a control signal and an abnormal feedback signal monitored by a signal monitor.

On the other hand, as illustrated in FIG. 5, when at least one of the first electrode 3c1 and the second electrode 3c2 is deteriorated, the feedback signal S2 does not immediately follow the outputting of the control signal S1. For example, the value indicated by the feedback signal S2 does not become a value obtained by reversing the positivity and negativity of the value indicated by the control signal S1. As a specific example, when at least one of the first electrode 3c1 and the second electrode 3c2 is deteriorated, a delay time D of the feedback signal S2 with respect to the control signal S1 occurs. Further, when at least one of the first electrode 3c1 and the second electrode 3c2 is deteriorated, the feedback signal S2 does not become stable. For example, the value indicated by the feedback signal S2 temporarily does not correspond to a value indicated by the control signal S1. As a specific example, fluctuation E (also referred to as fluttering) occurs in the feedback signal S2.

The "deterioration of the electrode" indicates, for example, the aged deterioration of the first electrode 3c1 or the second electrode 3c2. For example, when at least one of the first electrode 3c1 and the second electrode 3c2 is deteriorated due to repeated fusion discharge, the arc discharge becomes unstable. Further, the "deterioration of the electrode" indicates that, for example, after repeated discharge, silica which is a component of the optical fiber is deposited on at least one of the distal ends of the first electrode 3c1 and the second electrode 3c2. When at least one of the first electrode 3c1 and the second electrode 3c2 is deteriorated, dielectric breakdown is less likely to occur between the first electrode 3c1 and the second electrode 3c2, and the discharge becomes unstable. As a result, the feedback signal S2 may not follow the control signal S1.

Figure 6:
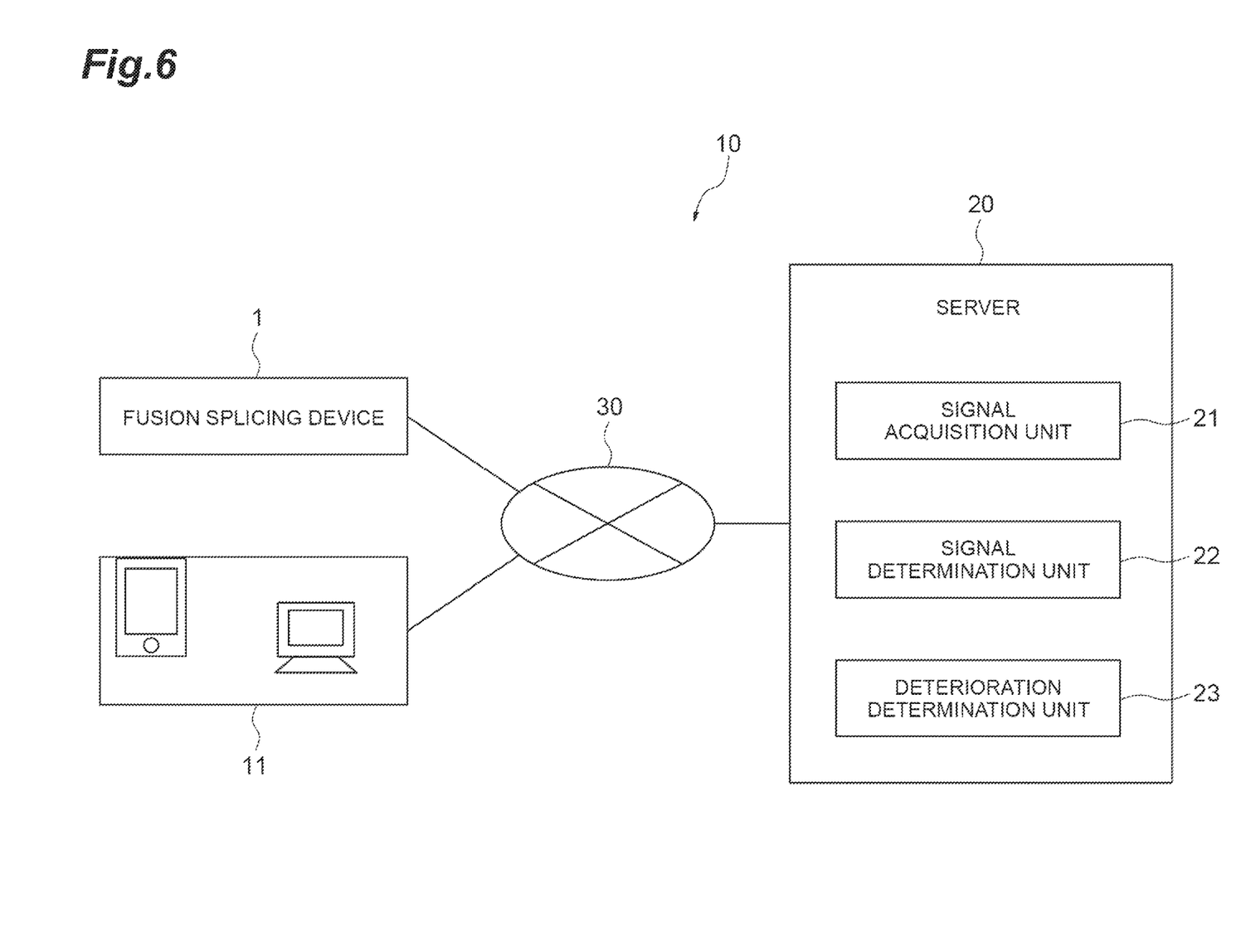
FIG. 6 is a block diagram illustrating a configuration of a fusion splicing system according to an embodiment.

In the fusion splicing device 1, the fusion splicing system 10, and the deterioration determination method according to this embodiment, the deterioration determination for the first electrode 3c1 and the second electrode 3c2 is performed by monitoring the feedback signal S2. Hereinafter, the configuration of the exemplary fusion splicing system 10 will be described with reference to FIG. 6. FIG. 6 is a diagram schematically illustrating the configuration of the fusion splicing system 10. The fusion splicing system 10 includes the fusion splicing device 1 described above, an information terminal 11, and a server 20.

The fusion splicing device 1 is configured to be able to communicate with the information terminal 11 by wireless communication. The information terminal 11 is, for example, a terminal owned by a manager of a construction project using the fusion splicing device 1. The information terminal 11 may be a mobile terminal such as a smartphone or a tablet or may be a fixed terminal such as a personal computer. The server 20 is, for example, a management server that supervises a plurality of the construction projects and is a computer capable of communicating with the fusion splicing device 1 and the information terminal 11 via an information communication network 30 such as the Internet. The fusion splicing device 1 and the information terminal 11 exist in the place, for example, different from that of the server 20.

The fusion splicing device 1 may include a computer including hardware such as a CPU, a RAM, a ROM, an input device, a wireless communication module, an auxiliary storage device, and an output device. Each function of the fusion splicing device 1 is realized by allowing these components to operate by a program or the like. The fusion splicing device 1 transmits, for example, data of the control signal S1 and the feedback signal S2 described above to the server 20. The data of the control signal S1 and the feedback signal S2 indicate, for example, the data of the control signal S1 and the feedback signal S2 converted into voltage values by the signal monitor 3g.

The server 20 is configured to include a computer including hardware such as a CPU, a RAM, a ROM, a communication module, and an auxiliary storage device. Each function of the server 20 is realized by allowing these components to operate by a program or the like. Functionally, the server 20 includes a signal acquisition unit 21, a signal determination unit 22, and a deterioration determination unit 23.

Hereinafter, an example where the server 20 includes the signal determination unit 22 and the deterioration determination unit 23 will be described. However, instead of the signal determination unit 22 and the deterioration determination unit 23 of the server 20, the fusion splicing device 1 may include a signal determination unit and a deterioration determination unit. Instead of the deterioration determination unit 23, the deterioration determination for the first electrode 3c1 and the second electrode 3c2 may be performed by the signal monitor 3g of the fusion splicing device 1.

The signal acquisition unit 21 acquires data (voltage values) of the control signal S1 and the feedback signal S2 from the fusion splicing device 1. The signal determination unit 22 determines whether or not there is abnormality in the feedback signal S2 acquired by the signal acquisition unit 21. For example, the signal determination unit 22 determines whether or not the value of the feedback signal S2 is a value corresponding to the value of the control signal S1. As a specific example, the signal determination unit 22 may determine whether or not the feedback signal S2 has the fluctuation E. Further, the signal determination unit 22 may determine whether or not the delay time D of the feedback signal S2 with respect to the control signal S1 is equal to or larger than a certain value. In this case, the signal determination unit 22 may determine that the feedback signal S2 is abnormal when the delay time D is equal to or larger than a certain value, and the signal determination unit 22 may determine that the feedback signal S2 is normal when the delay time D is not equal to or larger than a certain value.

The deterioration determination unit 23 determines from the state of the feedback signal S2 whether or not at least one of the first electrode 3c1 and the second electrode 3c2 is deteriorated. For example, when the signal determination unit 22 determines that the feedback signal S2 is normal, the deterioration determination unit 23 determines that the first electrode 3c1 and the second electrode 3c2 are not deteriorated. When the signal determination unit 22 determines that the feedback signal S2 is abnormal, the deterioration determination unit 23 determines that at least one of the first electrode 3c1 and the second electrode 3c2 is deteriorated. The deterioration determination unit 23 transmits the result of determination of whether or not there is deterioration in the first electrode 3c1 and the second electrode 3c2 to at least one of the fusion splicing device 1 and the information terminal 11. Then, the determination result of the deterioration determination unit 23 is displayed on, for example, the monitor 5 of the fusion splicing device 1 or the display of the information terminal 11.

Figure 7:
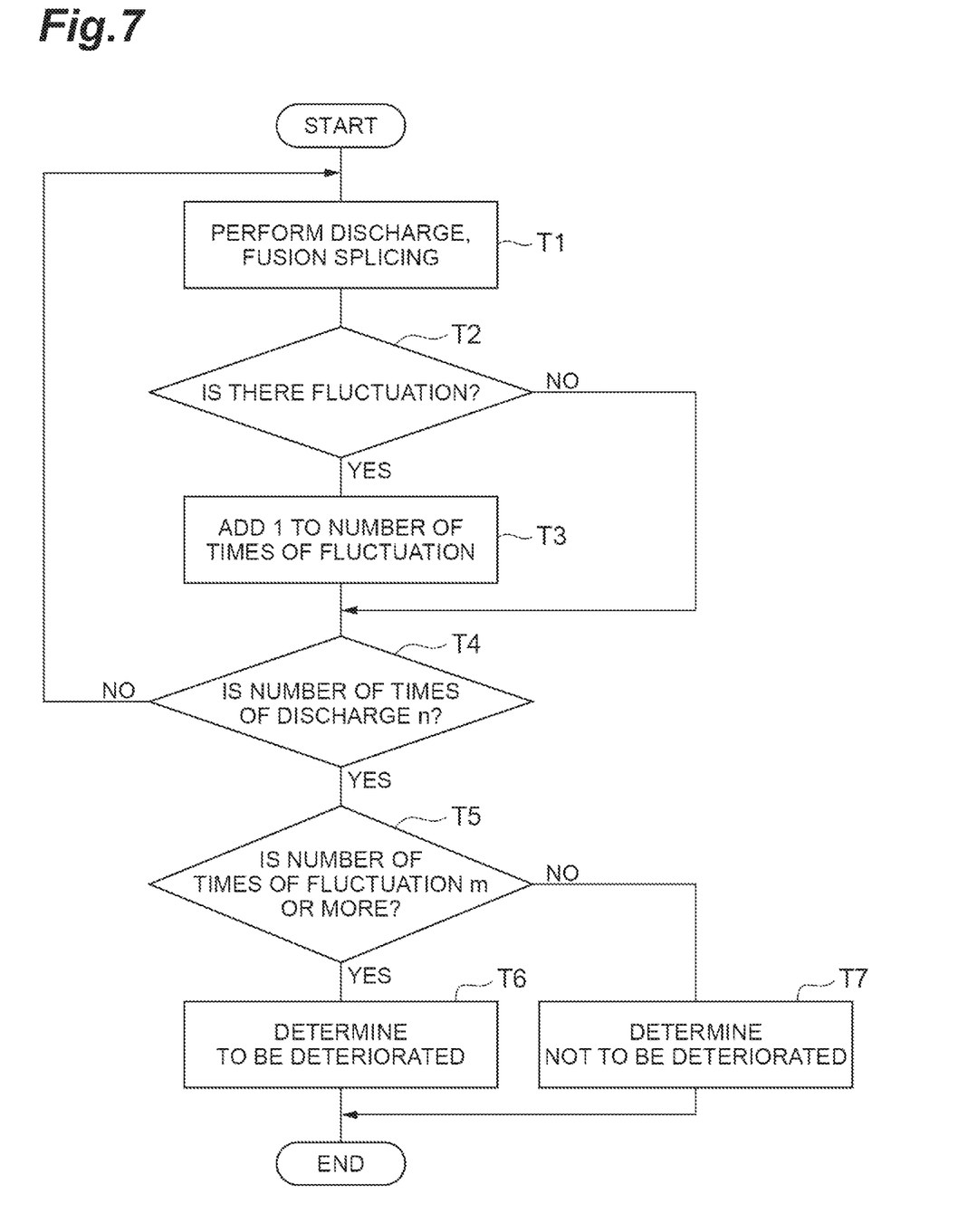
FIG. 7 is a flowchart illustrating an example of a process of a deterioration determination method according to an embodiment.

Next, the deterioration determination method according to this embodiment will be described with reference to the flowchart illustrated in FIG. 7. FIG. 7 is a flowchart illustrating an example of the processes of the deterioration determination method according to this embodiment. First, each of a pair of optical fibers is held in the optical fiber holder 3a, and the control signal is output to the first electrode 3c1 in the state where each optical fiber is positioned by the fiber positioning unit 3b. Then, arc discharge and fusion splicing of the optical fiber are performed (step T1).

At this time, the signal monitor 3g monitors the control signal S1 and the feedback signal S2, and the data of the control signal S1 and the feedback signal S2 are transmitted to the server 20. Then, the signal acquisition unit 21 acquires the data of the control signal S1 and the feedback signal S2, and the signal determination unit 22 determines whether or not there is abnormality in the feedback signal S2. As a specific example, the signal determination unit 22 determines whether or not there is fluctuation E (fluttering) in the feedback signal S2, and when there is fluctuation E, it is determined that the feedback signal S2 is abnormal (step T2).

When the signal determination unit 22 determines that there is fluctuation in the feedback signal S2, the signal determination unit 22 adds 1 to the number of times of fluctuation (the number of feedback signals S2 determined to be abnormal) (step T3). On the other hand, when the signal determination unit 22 determines that there is no fluctuation in the feedback signal S2, the process proceeds to step T4. In step T4, the deterioration determination unit 23 determines whether or not the number of times of discharge reaches n (n is a natural number). When it is determined that the number of times of discharge reaches n, the process proceeds to step T5, and when it is determined that the number of times of discharge does not reach n, the process returns to step T1 and discharge is performed again.

In step T5, the deterioration determination unit 23 determines the number of feedback signals S2 that are determined to be abnormal by the signal determination unit 22. As a specific example, the deterioration determination unit 23 determines whether or not the number of times of fluctuation in the feedback signal S2 is in (in is a natural number of n or less) or more. For example, when it is determined that the number of times of fluctuation is in or more, the deterioration determination unit 23 determines that at least one of the first electrode 3c1 and the second electrode 3c2 is deteriorated (step T6). On the other hand, when it is determined that the number of times of fluctuation is not in or more, the deterioration determination unit 23 determines that the first electrode 3c1 and the second electrode 3c2 are not deteriorated (step T7).

After performing the above determination, for example, the determination result is transmitted to one of the information terminal 11 and the fusion splicing device 1, and the determination result is displayed in one of the information terminal 11 and the fusion splicing device 1. After that, a series of steps is completed. As the example, the value of in is 4, and the value of n is 10. In this case, when the number of abnormal feedback signals S2 among the obtained ten feedback signals S2 is four or more, it is determined that the first electrode 3c1 and the second electrode 3c2 are deteriorated. As a specific example, when the fluctuation E occurs in the feedback signal S2 four or more times during ten times of discharge it is determined that at least one of the first electrode 3c1 and the second electrode 3c2 is deteriorated. However, the value of in and the value of n are not limited to the above examples, but can be changed as appropriate.

Herein, a method of counting the number of the feedback signals S2 will be illustrated. Normally, the discharge is continuously performed for a predetermined time, and the control signal S1 having a preset predetermined pattern is continuously generated. In a series of periods from the start of such discharge (when the control signal S1 for discharge is emitted) to the end of discharge, the feedback signals S2 are collectively counted as one feedback signal S2. In a series of periods from the start of discharge to the end of discharge at other timings, other feedback signals S2 are collectively counted as one feedback signal S2 different from the above-mentioned feedback signals S2. In this case, the number of feedback signals S2 is the same as the number of times of discharge.

Next, the functions and effects of the fusion splicing system 10, the fusion splicing device 1, and the deterioration determination method according to this embodiment will be described. In the fusion splicing system 10, the fusion splicing device 1, and the deterioration determination method according to this embodiment, the control signal S1 is output to the first electrode 3c1, and the feedback signal S2 of the control signal S1 is output from the second electrode 3c2. Then, it is determined from the state of the feedback signal S2 whether or not at least one of the first electrode 3c1 and the second electrode 3c2 is deteriorated.

Therefore, the feedback signal S2 of the control signal S1 can be effectively used for the determination for the first electrode 3c1 and the second electrode 3c2. When any one of the first electrode 3c1 and the second electrode 3c2 is deteriorated, the feedback signal S2 does not follow the control signal S1 along with the outputting of the control signal S1. In the fusion splicing system 10, the fusion splicing device 1, and the deterioration determination method according to this embodiment, since the deterioration determination for the first electrode 3c1 and the second electrode 3c2 is performed by using the characteristics of the feedback signal S2, the deterioration determination for the first electrode 3c1 and the second electrode 3c2 can be performed easily and with high accuracy.

As described above, the deterioration determination unit 23 may determine from both the state of the control signal S1 and the state of the feedback signal S2 whether or not the first electrode 3c1 and the second electrode 3c2 are deteriorated. In this case, since the state of the feedback signal S2 can be determined in comparison with the state of the control signal S1, the state of the feedback signal S2 can be determined easily and with higher accuracy. Therefore, the deterioration determination for the first electrode 3c1 and the second electrode 3c2 can be performed with higher accuracy.

The fusion splicing system 10, the fusion splicing device 1, and the deterioration determination method according to the embodiment may include the signal determination unit 22 that determines whether or not each of the plurality of feedback signals S2 is abnormal. The deterioration determination unit 23 may determine based on the number of feedback signals S2 determined to be abnormal by the signal determination unit 22 whether or not a first electrode 3b1 and a second electrode 3b2 are deteriorated. In this case, since the deterioration determination for the electrode is performed based on the number of feedback signals S2 determined to be abnormal by the signal determination unit 22, the deterioration determination for the electrode can be easily performed. Further, by performing the deterioration determination for the electrode by using the result of the signal determination unit 22 determining whether or not there is abnormality in the plurality of feedback signals S2, the deterioration determination for the electrode can be performed with higher accuracy.

The deterioration determination unit 23 may determine from the state of the voltage value of the feedback signal S2 whether or not the first electrode 3c1 and the second electrode 3c2 are deteriorated. In this case, since the state of the feedback signal S2 can be determined by using the voltage signal that is easy to handle in performing the signal processing, the determination for the feedback signal S2 and the deterioration determination for the electrode can be further easily performed.

Heretofore, the embodiments of the fusion splicing system 10, the fusion splicing device 1, and the deterioration determination method according to the present disclosure are described. However, the present invention is not limited to the above-described embodiment. That is, it is easily recognized by those skilled in the art that the present invention can be changed and modified in various forms within the scope of the spirit described in the scope of the claims. For example, the configuration of each of the components of the fusion splicing system and the fusion splicing device can be changed as appropriate, and the content and order of each of the steps of the deterioration determination method are not limited to those of the above-described embodiment and can be changed as appropriate.

Figure 8:
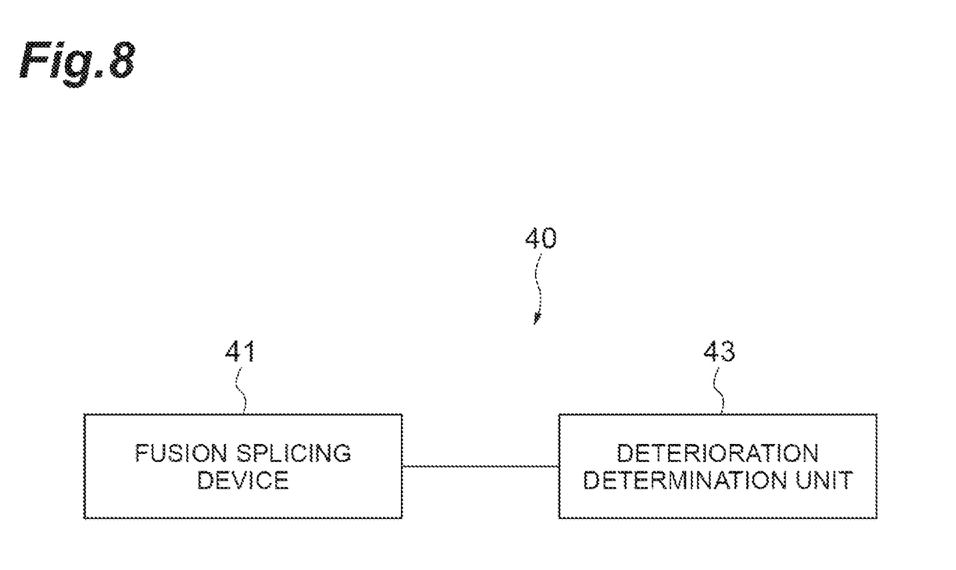
FIG. 8 is a block diagram illustrating a configuration of a fusion splicing system according to Modified Example.
Figure 9:
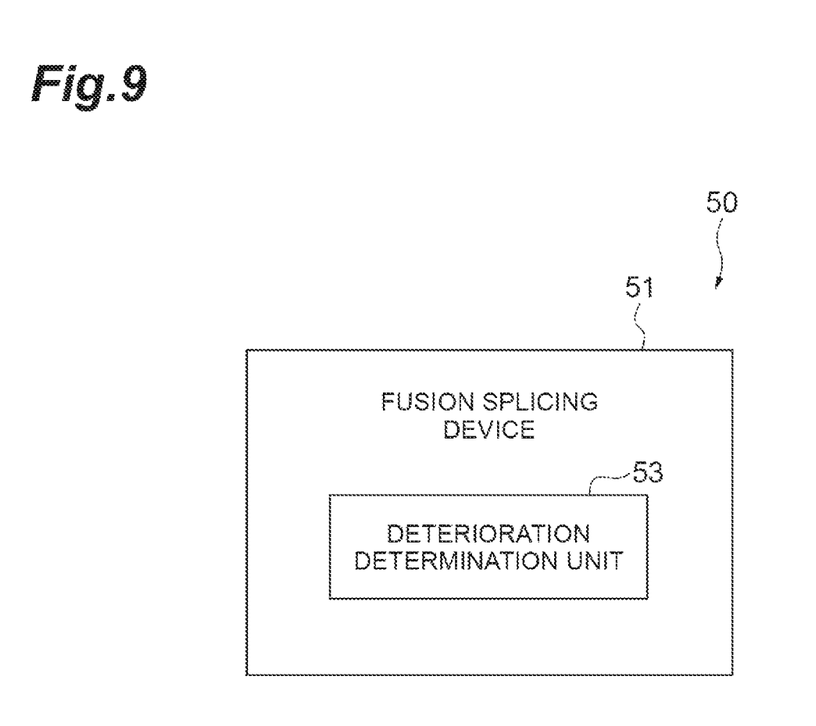
FIG. 9 is a block diagram illustrating a configuration of a fusion splicing system according to Modified Example.

For example, in the above-described embodiment, the example is described where the server 20 includes the signal acquisition unit 21, the signal determination unit 22, and the deterioration determination unit 23, and the deterioration determination unit 23 of the server 20 performs the deterioration determination for an electrode 3c. However, as illustrated in FIG. 8, a deterioration determination unit 43 may be a fusion splicing system 40 provided separately from a fusion splicing device 41. Further, as illustrated in FIG. 9, a fusion splicing device 51 may be a fusion splicing system 50 including a deterioration determination unit 53. Further, as described above, the fusion splicing device 1 may include the signal determination unit and the deterioration determination unit, and the information terminal 11 may include the signal determination unit and the deterioration determination unit. In this manner, the locations of the signal determination unit and the deterioration determination unit can be changed as appropriate. For example, when the fusion splicing device 1 includes the signal determination unit and the deterioration determination unit, the information terminal 11 and the server 20 cannot be required.

In the above-described embodiment, an example where deterioration determination for the first electrode 3c1 and the second electrode 3c2 is performed from the state of the voltage value of the feedback signal S2 is described. However, the deterioration determination for the first electrode 3c1 and the second electrode 3c2 may be performed from the value of the current value of the feedback signal S2. That is, the signal monitor 3g may monitor the current value of the control signal S1 and the current value of the feedback signal S2 and performs the deterioration determination for the first electrode 3c1 and the second electrode 3c2 based on these current values. The current value has an advantage that it is easier to grasp a minute change than the voltage value.

In the above-described embodiment, an example where the determination results of the first electrode 3c1 and the second electrode 3c2 by the deterioration determination unit 23 are displayed is described. However, the discharge power to the first electrode 3c1 and the second electrode 3c2 may be strengthened after it is determined that at least one of the first electrode 3c1 and the second electrode 3c2 is deteriorated. In this case, the silica and the like adhering to the first electrode 3c1 or the second electrode 3c2 can be cleaned (evaporated) by a strong discharge power to the first electrode 3c1 and the second electrode 3c2, and thus, the strong discharge power contributes to the suppression of the progress of deterioration.

In the above-described embodiment, an example of determining the deterioration of the first electrode 3c1 and the second electrode 3c2 based on whether or not there is fluctuation E in the feedback signal S2 is described. However, for example, the deterioration determination for the first electrode 3c1 and the second electrode 3c2 may be performed based on the delay time D of the feedback signal S2 with respect to the control signal S1. Further, when several times of fluctuations E are generated in the feedback signal S2, it may be determined that the first electrode 3c1 and the second electrode 3c2 are deteriorated. As described above, the method for determining the deterioration of the first electrode 3c1 and the second electrode 3c2 from the feedback signal S2 is not limited to the above-described embodiment and can be appropriately changed.

In the above-described embodiment, in a series of periods from the start of discharge to the end of discharge, the feedback signals S2 are collectively counted as one, but the series of periods from the start of discharge to the end of discharge is divided for a predetermined time intervals, the feedback signal S2 may be collectively counted as one for each divided period. For example, assuming that the discharge time is set to 10 seconds and the time interval is set to 2 seconds, in a first period from the start of discharge up to the lapse of 2 seconds, the feedback signal S2 is counted as one, and in a second period from 2 seconds to 4 seconds after the start of discharge, the feedback signal S2 may be counted as another one. In this case, in one discharge, the number of division periods is five, and the number of feedback signals S2 is five. Further, the previously-mentioned counting method and the above-mentioned counting method may be mixed. For example, assuming that the time interval is denoted by T, when a series of time from the start of discharge to the end of discharge is T or less, the feedback signals S2 from the start of discharge to the end of discharge are collectively counted as one, and when a series of time from the start of discharge to the end of discharge larger than T, the feedback signals S2 within the period divided for each time interval T may be counted as one.

In the above-described embodiment, the deterioration determination for the first electrode 3c1 and the second electrode 3c2 is perform based on the discharge state when the fusion splicing of the optical fibers is actually performed, but when the discharge in the absence of the optical fiber is performed, so-called discharge test is performed, the deterioration determination may be is performed, and when discharge is performed in any states, these states may be included in the determination target.

REFERENCE SIGNS LIST

1: fusion splicing device, 2: housing, 3: fusion unit, 3a: optical fiber holder, 3b: fiber positioning unit, 3c1: first electrode, 3c2: second electrode, 3d: discharge circuit, 3f: high pressure unit, 3g: signal monitor, 3h: oscilloscope, 4: heater, 5: monitor, 6: windshield cover, 6a: side surface, 6b: introduction port, 10: fusion splicing system, 11: information terminal, 20: server, 21: signal acquisition unit, 22: signal determination unit, 23: deterioration determination unit, 30: information communication network, D: delay time, E: fluctuation.

What is claimed is:

1. A fusion splicing system comprising:
   first and second electrodes that fusion-splice optical fibers by discharge;
   a fusion splicing device that has a discharge circuit that outputs a control signal to the first electrode and receives a feedback signal of the control signal from the second electrode; and
   a deterioration determination unit that determines from a state of the feedback signal whether or not the first electrode and the second electrode are deteriorated.

2. The fusion splicing system according to claim 1, wherein the deterioration determination unit determines from both a state of the control signal and a state of the feedback signal whether or not the first electrode and the second electrode are deteriorated.

3. The fusion splicing system according to claim 1, comprising a signal determination unit that determines whether or not each of the plurality of feedback signals is abnormal,
   wherein the deterioration determination unit determines based on the number of the feedback signals determined to be abnormal by the signal determination unit whether or not the first electrode and the second electrode are deteriorated.

4. The fusion splicing system according to claim 1, wherein the deterioration determination unit determines from the state of a voltage value of the feedback signal whether or not the first electrode and the second electrode are deteriorated.

5. The fusion splicing system according to claim 3, wherein
   the signal determination unit determines that the feedback signal is abnormal when a delay time is equal to or larger than a certain value, and the signal determination unit determines that the feedback signal is normal when the delay time is not equal to or larger than a certain value.

6. The fusion splicing system according to claim 3, wherein
   when the signal determination unit determines that the feedback signal is abnormal, the deterioration determination unit determines that at least one of the first electrode and the second electrode is deteriorated.

7. The fusion splicing system according to claim 1, wherein
   the deterioration determination unit transmits a result of determination of whether or not there is deterioration in the first electrode and the second electrode to at least one of the fusion splicing device and an information terminal.

8. The fusion splicing system according to claim 7, wherein
   a determination result of the deterioration determination unit is displayed on a monitor of the fusion splicing device or a display of the information terminal.

9. The fusion splicing system according to claim 3, wherein
   the signal determination unit determines whether or not there is fluctuation in the feedback signal, and when there is fluctuation, it is determined that the feedback signal is abnormal.

10. The fusion splicing system according to claim 1, wherein
    a deterioration determination for the first electrode and the second electrode is performed from a value of a current value of the feedback signal.

11. The fusion splicing system according to claim 1, wherein
    a discharge power to the first electrode and the second electrode is strengthened after it is determined that at least one of the first electrode and the second electrode is deteriorated.

12. The fusion splicing system according to claim 1, wherein
    a deterioration determination for the first electrode and the second electrode is performed based on a delay time of the feedback signal with respect to the control signal.

13. The fusion splicing system according to claim 1, wherein
    when several times of fluctuations are generated in the feedback signal, it is determined that the first electrode and the second electrode are deteriorated.

14. A fusion splicing device comprising:
    first and second electrodes that fusion-splice optical fibers by discharge;
    an discharge circuit that outputs a control signal to the first electrode and receives a feedback signal of the control signal from the second electrode; and
    a signal monitor that monitors the feedback signal and determines from a state of the feedback signal whether or not the first electrode and the second electrode are deteriorated.

15. The fusion splicing device according to claim 14, wherein
    when the discharge circuit receives a control signal indicating that the optical fiber is fused, the discharge circuit applies a high voltage to the first electrode via a high pressure unit.

16. The fusion splicing device according to claim 14, wherein
    the signal monitor includes an oscilloscope which is a signal display device, and the control signal and the feedback signal are displayed on the oscilloscope.

17. The fusion splicing device according to claim 14, wherein the signal monitor monitors a current value of the control signal and the current value of the feedback signal and performs a deterioration determination for the first electrode and the second electrode based on these current values.

18. A deterioration determination method being a deterioration determination method that determines whether or not there is deterioration in a first electrode and a second electrode that fusion-splice optical fibers by discharge, comprising:

outputting a control signal to the first electrode;

receiving a feedback signal of the control signal from the second electrode; and determining from a state of the feedback signal whether or not the first electrode and the second electrode are deteriorated.

\* \* \* \* \*